(12) United States Patent
Nahum

(10) Patent No.: US 9,618,366 B2
(45) Date of Patent: Apr. 11, 2017

(54) ABSOLUTE ENCODER SCALE CONFIGURATION WITH UNIQUE CODED IMPEDANCE MODULATIONS

(71) Applicant: Mitutoyo Corporation, Kanagawa-ken (JP)

(72) Inventor: Michael Nahum, Kirkland, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 345 days.

(21) Appl. No.: 14/553,709

(22) Filed: Nov. 25, 2014

(65) Prior Publication Data

US 2016/0146636 A1 May 26, 2016

(51) Int. Cl.
*G01R 33/02* (2006.01)
*G01D 5/20* (2006.01)

(52) U.S. Cl.
CPC ................... *G01D 5/2053* (2013.01)

(58) Field of Classification Search
CPC .. G01D 5/2053; G01D 5/2046; G01D 5/2291; G01D 5/2216; G01B 7/003
See application file for complete search history.

(56) References Cited

U.S. PATENT DOCUMENTS

| | | |
|---|---|---|
| 5,345,231 A | 9/1994 | Koo et al. |
| 5,598,169 A | 1/1997 | Drabeck et al. |
| 5,606,323 A | 2/1997 | Heinrich et al. |
| 5,804,963 A * | 9/1998 | Meyer ................... G01D 5/202 |
| | | 324/207.17 |
| 5,812,065 A | 9/1998 | Schrott et al. |
| 5,886,519 A | 3/1999 | Masreliez et al. |
| 6,005,387 A * | 12/1999 | Andermo ............ G01D 5/2086 |
| | | 324/207.12 |

(Continued)

FOREIGN PATENT DOCUMENTS

EP     0324564 A2     7/1989

OTHER PUBLICATIONS

Wikipedia, "Radio-Frequency Identification," <<http://en.wikipedia.org/wiki/Radio-frequency_identification>> retrieved on Oct. 28, 2014, 27 pages.

(Continued)

*Primary Examiner* — Tung X Nguyen
*Assistant Examiner* — Dominic Hawkins
(74) *Attorney, Agent, or Firm* — Seed Intellectual Property Law Group LLP

(57) ABSTRACT

An absolute scale configuration is provided for use in a position encoder which includes a readhead and a scale. The absolute scale configuration includes a plurality of scale loops distributed along a measuring axis to provide a position dependent signal that varies depending on a relative position between the scale loops and the readhead. At least some of the scale loops are coupled to respective impedance modulating circuits connected to receive energy from current induced in the scale loop and to provide a unique coded modulation of the scale loop impedance during a code signal generating state. The unique coded modulations as sensed by the readhead are indicative of a coarse resolution absolute position, which may be utilized in combination with the position dependent signal to determine an absolute position with a high resolution.

20 Claims, 6 Drawing Sheets

(56) References Cited

U.S. PATENT DOCUMENTS

| | | | |
|---|---|---|---|
| 6,329,813 B1 * | 12/2001 | Andermo | G01B 3/205 324/207.12 |
| 6,335,618 B1 | 1/2002 | Nahum | |
| 6,400,138 B1 | 6/2002 | Andermo | |
| 6,545,461 B1 * | 4/2003 | Miyata | G01D 5/2053 324/207.17 |
| 6,720,760 B2 * | 4/2004 | Milvich | G01D 5/2086 324/207.17 |
| 6,819,246 B1 | 11/2004 | Seppae et al. | |
| 6,870,461 B2 | 3/2005 | Fischer et al. | |
| 7,236,092 B1 | 6/2007 | Joy | |
| 7,348,875 B2 | 3/2008 | Hughes et al. | |
| 7,511,903 B2 | 3/2009 | Tanaka | |
| 7,595,729 B2 * | 9/2009 | Ku | G06K 19/0723 340/10.4 |
| 7,598,864 B2 | 10/2009 | Sugimura et al. | |
| 8,086,200 B2 | 12/2011 | Sutton et al. | |
| 8,531,297 B2 | 9/2013 | Ferguson et al. | |
| 2002/0097043 A1 * | 7/2002 | Sasaki | G01B 7/003 324/207.17 |
| 2003/0090264 A1 * | 5/2003 | Milvich | G01D 5/2086 324/207.16 |
| 2003/0160608 A1 * | 8/2003 | Milvich | G01D 5/2053 324/207.17 |
| 2012/0153089 A1 | 6/2012 | Galm et al. | |

OTHER PUBLICATIONS

Svensson, Andreas, "Design of Inductive Coupling for Powering and Communication of Implantable Medical Devices," Master of Science Thesis in Microelectronics, Royal Institute of Technology, Stockholm, Oct. 2012, 79 pages.

\* cited by examiner

ABSOLUTE ENCODER SCALE CONFIGURATION WITH UNIQUE CODED IMPEDANCE MODULATIONS

BACKGROUND

Technical Field

The present disclosure relates generally to precision metrology, and more particularly to induced current linear and rotary absolute position encoders.

Description of the Related Art

Induced current position encoders typically have a readhead that is movable relative to a scale member, and includes one or more transducers comprising an excitation winding and receiver winding(s). The receiver winding(s) may have a wavelength which is different for different transducers. Each transducer will have a scale or track on the scale member which includes a plurality of flux modulators. The flux modulators may each have a length along the measuring axis that is equal to one-half of the wavelength of the corresponding receiver winding(s).

U.S. Pat. No. 6,329,813, which is commonly assigned and hereby incorporated herein by reference in its entirety, discloses an absolute position encoder transducer with improved winding configurations which increase the proportion of the useful output signal component relative to extraneous ("offset") components of the output signal.

While the '813 patent provides improved winding configurations, the length that the absolute scale can be extended to for a given scale width and accuracy or resolution remains limited (e.g., due in part to limitations for the fabrication accuracy and signal interpolation of such readheads). A need exists for a compact position encoder capable of longer absolute ranges with high accuracy.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

An absolute scale configuration is provided for use in a position encoder which includes a readhead and a scale. The readhead includes a spatially modulated signal coupling configuration, and a readhead processor. The scale extends along the measuring axis of the position encoder, and the readhead is movable relative to the scale along the measuring axis. The absolute scale configuration includes a plurality of scale loops and a plurality of impedance modulating circuits. The plurality of scale loops include signal coupling loop portions distributed periodically along the measuring axis. The signal coupling loop portions are configured to inductively couple to the spatially modulated signal coupling configuration of the readhead to produce at least one position-dependent signal in the readhead that varies periodically spatially depending on a relative position between the scale loops and the readhead during a position dependent signal generating state. The plurality of impedance modulating circuits are connected to at least some of the plurality of scale loops.

In various implementations, each of the impedance modulating circuits includes an energy coupling portion and a controller portion. The energy coupling portion receives energy from a current induced in the connected scale loop by the readhead. The controller portion is powered by the energy coupling portion and controls operations during the position dependent signal generating state and a code signal generating state. During the position dependent signal generating state, the controller portion causes the impedance modulating circuit to provide very low impedance within the connected scale loop at the excitation frequency, and does not modulate the scale loop impedance. In this manner, the operations of the scale loop during the position dependent signal generating state are allowed to occur substantially as they would without the presence of the impedance modulating circuit. During the code signal generating state, the controller portion causes the impedance modulating circuit to modulate the scale loop impedance using a unique coded modulation to produce a unique coded signal in the readhead. The unique coded signal is indicative of a coarse resolution absolute position of the scale loops and corresponding absolute scale configuration relative to the readhead. The readhead processor analyzes the coarse resolution absolute position in combination with the at least one position-dependent signal to provide an absolute position of the scale loops relative to the readhead with a resolution that is better than the coarse resolution absolute position.

DETAILED DESCRIPTION

Figure 1:
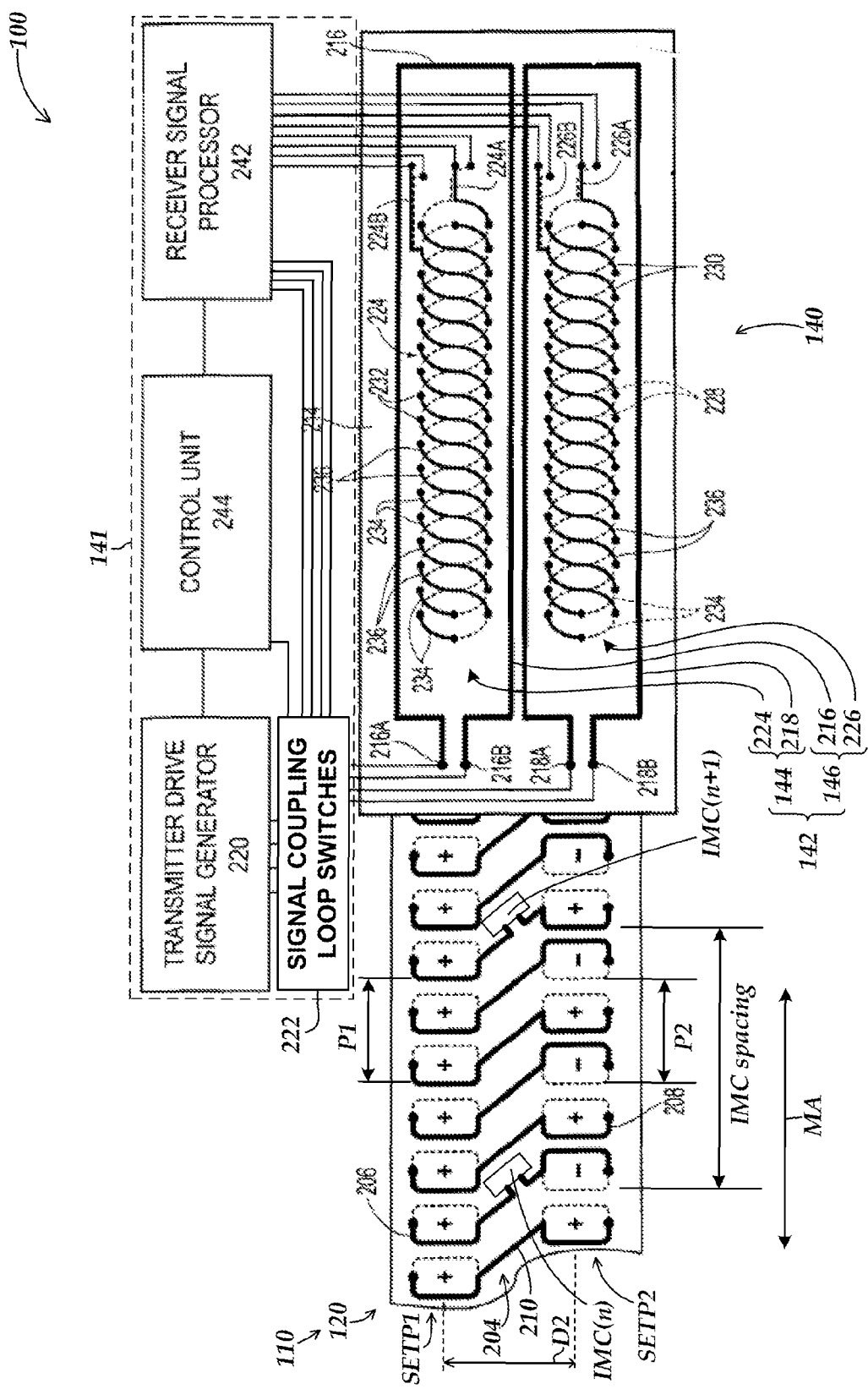
FIG. 1 is a diagram of a position encoder including a first exemplary implementation of an absolute scale configuration with impedance modulating circuits.

FIG. 1 is a diagram of a position encoder 100 including a first exemplary implementation of an absolute scale configuration 120 with impedance modulating circuits IMC. The absolute scale configuration 120 is provided on a scale 110 of the position encoder, and a readhead 140 of the position encoder is movable relative to the scale along a measuring axis MA of the scale. The readhead 140 includes a readhead processor 141 and a spatially modulated signal coupling configuration 142. The spatially modulated signal coupling configuration 142 includes a first spatially modulated signal coupling configuration 144 comprising windings 218 and 224 and a second spatially modulated signal coupling configuration 146 comprising windings 216 and 226, located on a substrate 214. The absolute scale configuration 120 includes a plurality of scale loops 204 which include signal coupling loop portions 206 and 208 distributed periodically along the measuring axis MA.

As will be described in more detail below, the signal coupling loop portions 206 and 208 are configured to inductively couple to the spatially modulated signal coupling configuration 142 of the readhead 140 to produce at least one position-dependent signal in the readhead that varies spatially periodically depending on a relative position between the scale loops 204 and the readhead 140 during a position dependent signal generating state. As will further be described in more detail below, at least some of the plurality of scale loops 204 are connected to respective impedance modulating circuits IMC which are configured to modulate the impedance of the connected scale loops 204 using a unique coded modulation during a code signal generating state to produce a unique coded signal in the readhead 140. The unique coded signal is indicative of a coarse resolution absolute position of the scale loops 204 relative to the readhead 140. The readhead processor 141 then analyzes the coarse resolution absolute position in combination with the at least one position-dependent signal to provide an absolute position of the scale loops 204 relative to the readhead 140 with a resolution that is better than the coarse resolution absolute position.

Various examples of scale loops, as well as certain other components of the position encoder 100, are described in more detail in the previously incorporated '813 patent. In the embodiment shown in FIG. 1, each scale loop 204 includes a first signal coupling loop portion 206 and a second signal coupling loop portion 208, connected by a pair of connecting conductors 210 (e.g., fabricated on two printed circuit board layers). The coupling loop portions 206 form a first set of signal coupling loop portions SETP1 arranged along the measuring axis MA periodically based on a spatial wavelength P1, at one edge of the absolute scale configuration 120. The loop portions 206 inductively couple to the spatially modulated receiver windings 224 to produce at least a first position-dependent signal in the readhead that varies spatially periodically at the spatial wavelength P1 depending on a relative position between the scale loops 204 and the readhead 140, during a portion of a position dependent signal generating state when the loop portions 208 are excited by the winding 218.

The loop portions 208 form a second set of signal coupling loop portions SETP2 that is arranged along the measuring axis MA periodically based on a spatial wavelength P2. The loop portions 208 inductively couple to the spatially modulated receiver windings 226 to produce at least a first position-dependent signal in the readhead that varies spatially periodically at the spatial wavelength P2 depending on the relative position between the scale loops 204 and the readhead 140, during a portion of a position dependent signal generating state when the loop portions 206 are excited by the winding 216. As will be further described below, the spatial wavelengths P1 and P2 have a unique phase relationship along the measuring axis direction over a range defining a medium spatial wavelength Pmed.

The connecting conductors 210 are shown to extend transverse to the measuring axis MA to connect the first and second signal coupling loop portions 206 and 208. For some scale loops 204, a connecting conductor 210 connects an impedance modulating circuit IMC into the scale loop 204, as will be described in more detail below.

As shown in FIG. 1, the readhead processor 141 includes a transmitter drive signal generator 220, signal coupling loop switches 222, a receiver signal processor 242 and a control unit 244. The first spatially modulated signal coupling configuration 144 is illustrated as including an excitation winding 218 and a first set of spatially modulated receiver windings 224. The second spatially modulated signal coupling configuration 146 is illustrated as including an excitation winding 216 and a second set of spatially modulated receiver windings 226.

Each of the excitation windings 216 and 218 have the same long dimension extending along the measuring axis MA. The terminals 216A and 216B of the excitation winding 216 and the terminals 218A and 218B of the excitation winding 218 are connected to the transmitter drive signal generator 220 by the signal coupling loop switches 222 as controlled by the control unit 244. As will be described in more detail below, during a position dependent signal generating state, the control unit 244 controls the signal coupling loop switches 222 to connect the transmitter drive signal generator 220 so as to selectively output a time-varying drive signal at an excitation frequency to either the excitation winding 216 or the excitation winding 218. Thus, either a time-varying current flows through the excitation winding 216 or through the excitation winding 218.

In response to the transmitter drive signal generator 220 applying a time-varying drive signal (e.g., at an excitation frequency) to the excitation winding 216 during a first time period, a magnetic field is generated. In response, a current is induced in the loop portions 206 that counteracts the change of magnetic field, which also causes a current in the connected loop portions 208. In the embodiment shown in in FIG. 1, adjacent loop portions 208 have loop currents having opposite polarities (e.g., corresponding to every other scale loop 204 being "twisted"). Thus, a secondary magnetic field is created having field portions of opposite polarity periodically distributed along the measuring axis across the loop portions 208. A spatial wavelength P2 of the periodic secondary magnetic field is equal to the spacing of the same polarity loop portions 208.

Similarly, in response to the transmitter drive signal generator 220 applying a time-varying drive signal to the excitation winding 218 during a second time period, a current is induced in the loop portions 208 and 206. Adjacent loop portions 206 will have loop currents having opposite polarities (e.g., corresponding to every other scale loop 204 being "twisted"). Thus, a secondary magnetic field is created having field portions of opposite polarity periodically distributed along the measuring axis across the loop portions 206. The spatial wavelength P1 of this secondary magnetic field is equal to the spacing of the same polarity loop portions 206.

The set of spatially modulated receiver windings 224 includes first and second receiver windings 224A and 224B. The set of spatially modulated receiver windings 226 includes first and second receiver windings 226A and 226B. The sets of spatially modulated receiver windings 224 and 226 are each formed by a plurality of loop segments 228 and 230 formed on two layers of a printed circuit board forming the readhead 140. The loop segments 228 and 230 are linked through feed-throughs 232 to form alternating positive polarity loops 234 and negative polarity loops 236 in each of the receiver windings 224A, 224B, 226A and 226B. The set of spatially modulated receiver windings 224 inductively couples to the loop portions 206. The second set of spatially modulated receiver windings 226 inductively couples to the loop portions 208.

In one specific example implementation, each of the loop portions 206 is arranged at a pitch equal to one-half of the spatial wavelength P1 that matches a wavelength of the first set of spatially modulated receiver windings 224. Each of the loop portions 208 is arranged at a pitch equal to one-half of the spatial wavelength P2 that matches a wavelength of the second set of spatially modulated receiver windings 226.

As shown in FIG. 1, the loop portions 208 are spaced at a distance D2 from the loop portions 206. The spatially modulated receiver windings 224 and 226 are also spaced at the distance D2 from each other, and the excitation windings 216 and 218 are also spaced at the distance D2 from each other. Accordingly, when the readhead 140 is placed in proximity to the absolute scale configuration 120, as shown in FIG. 1, an operational alignment along the measuring axis is established between concurrently operating windings and loop portions, consistent with signal processing principles outlined herein.

In operation, during a position dependent signal generating state the control unit 244 controls the signal coupling loop switches 222 to connect the transmitter drive signal generator 220, which outputs a time-varying drive signal (e.g., at an excitation frequency), to a first or "active" one of the excitation winding 216 or the excitation winding 218. Currents are induced in the loops 204, and sensed by the "active" one of the spatially modulated receiver winding 226 or 224, which corresponds to the active one of the excitation windings, as outlined above. As described in more detail below, for a loop 204 that is connected to an impedance modulating circuit IMC, the induced current charges-up and activates the impedance modulating circuit IMC. In various implementations, the impedance modulating circuits IMC (also referred to simply as IMCs) are configured to initially enter a mode where they provide relatively low impedance for the induced current and allow the connected scale loops to operate similarly to the other scale loops during a position dependent signal generating state. Thus, during the position dependent signal generating state for scale loops 204 connected to the IMCs, as well as for scale loops 204 not connected to IMCs, the currents in each of the loops 204 are nominally similar and produce the alternating polarity or spatially modulated magnetic field along the measuring axis MA as outlined previously. As a result, the active one of the spatially modulated receiver windings 226 or 224, as the readhead 140 moves relative to the absolute scale configuration 120, outputs a signal that is a periodic function of the position "x" of the readhead 140 along the absolute scale configuration 120. The entire process is described in more detail in the previously incorporated '813 patent.

The receiver signal processor 242 of the readhead processor 141 inputs and samples the output signals from the active one of the spatially modulated receiver windings 226 or 224, converts these signals to digital values and outputs them to control unit 244. The control unit 244 processes these digitized output signals to determine the relative position x, or spatial phase, between the readhead 140 and the absolute scale configuration 120 within a first spatial wavelength (P1 or P2) corresponding to the currently active one of the spatially modulated receiver windings 226 or 224. Then, during a next portion of the position dependent signal generating state, the transmitter drive signal generator 220 is coupled to the other one of the excitation windings 216 or 218, to make it active by applying a time-varying drive signal (e.g., at an excitation frequency). The other one of the spatially modulated receiver windings 226 or 224, corresponding to the currently-active excitation winding is similarly connected and made active by the receiver signal processor 242, which again samples the output signals from the active one of the spatially modulated receiver windings 226 or 224, converts these signals to digital values and outputs them to control unit 244. The control unit 244 again processes these digitized output signals to determine the relative position x, or spatial phase, between the readhead 140 and the absolute scale configuration 120 within a second spatial wavelength (P2 or P1) corresponding to the currently active one of the spatially modulated receiver windings 226 or 224.

It will be appreciated that any of the signal generating and processing circuits shown in the incorporated references can be used to implement the transmitter drive signal generator 220, the signal coupling loop switches 222, the receiver signal processor 242 and the control unit 244. Thus, these circuits will not be described in further detail herein. The spatial wavelengths P1 and P2 have values that are close to each other. Thus, the spatial phase difference between the signals derived from the two spatially modulated receiver windings 226 or 224 goes through a full 360 degree "phase difference" cycle over a spatial length much longer than either of the individual spatial wavelengths P1 and P2. In one implementation, this spatial length may be defined as a medium spatial wavelength Pmed, over which the spatial wavelengths P1 and P2 have a unique phase relationship along the measuring axis over the corresponding range. Accordingly, position output information from the sets of spatially modulated receiver windings 224 and 226 can be combined by the control unit 244 for an absolute position measurement within each medium spatial wavelength Pmed. As one specific illustrative example, in one implementation where the spatial wavelengths P1 and P2 are each about 2 mm, the resulting medium spatial wavelength Pmed may be around 40 mm. The processing for signals to obtain such measurements over a range such as the medium spatial wavelength Pmed is described in U.S. Pat. No. 5,886,519, which is commonly assigned and hereby incorporated by reference herein in its entirety. Thus, a discussion of signal processing techniques will not be described in further detail herein.

In the implementation of FIG. 1, a coarse resolution absolute position is also determined and utilized by the control unit 244 so as to further extend the absolute range of the encoder 100. More specifically, the coarse resolution absolute position, medium wavelength position, and fine wavelength positions are all utilized in combination by the control unit 244 to determine and provide an absolute position over a long range with a relatively high resolution. As described herein, the coarse resolution absolute position is determined through the utilization of the IMCs. Briefly, when a current is induced in their connected loop, each of such respective IMCs operates during a code signal generating state to produce a coded signal in the readhead 140 corresponding to their unique identity and/or location. The unique coded signal is thus indicative of a unique coarse resolution absolute position of the absolute scale 120 and/or the scale loops 204 relative to the readhead 140. Generally speaking, for the embodiment shown in FIG. 1 and described above, respective IMCs need to be provided at a spacing sufficient to distinguish between different periods of the medium spatial wavelength Pmed, using a compatible signal processing scheme. In some example implementations exhibiting different design choices, the IMCs may be connected to scale loops 204 that are located along the measuring axis MA at a spacing that is at least 0.25*Pmed, and at most Pmed, or at a spacing that is at least 0.5*Pmed and less than at least one of (Pmed-P1) or (Pmed-P2), or the like.

As also illustrated in FIG. 1, in various implementations respective impedance modulating circuits IMC(n) and IMC(n+1) may be connected to scale loops 204 having opposite polarity configurations. For example, the impedance modulating circuit IMC(n) is shown as connected to a scale loop 204 with a signal coupling loop portion 208 indicating a negative polarity, while the impedance modulating circuit IMC(n+1) is shown as connected to a scale loop 204 with a signal coupling loop portion 208 indicating a positive polarity. In certain implementations, the connections to scale loops 204 having opposite polarity transitions may help provide a more desirable balance between the signals produced by the positive and negative loops during the position dependent signal generating state when the impedance modulating circuits IMC are in a low impedance mode.

Figure 2:
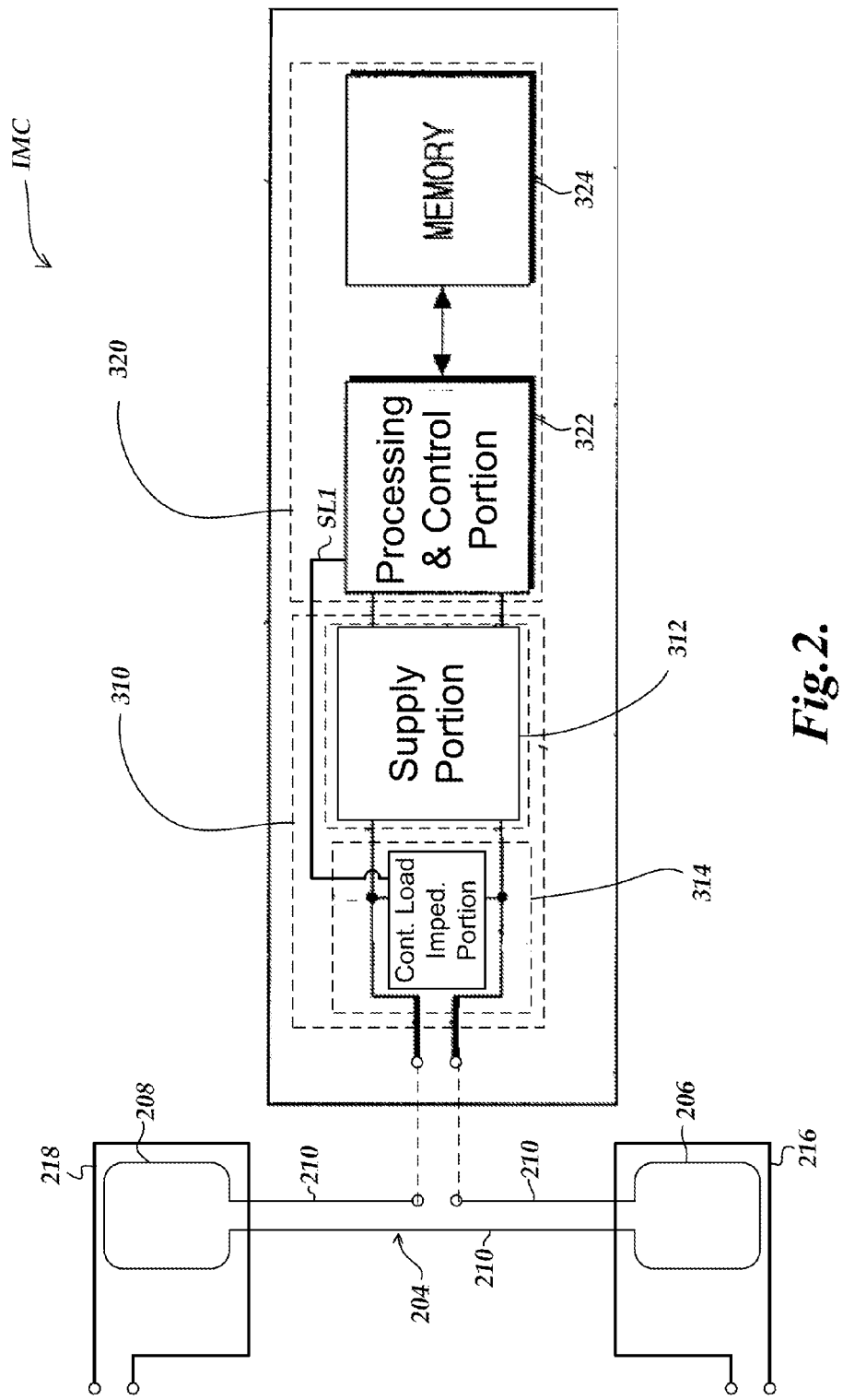
FIG. 2 is a diagram of an exemplary implementation of one of the impedance modulating circuits of FIG. 1.

FIG. 2 is a diagram of one exemplary implementation of an IMC, usable as one of the impedance modulating circuits IMC(n) or IMC(n+1) of FIG. 1. As shown in FIG. 2, the IMC includes an energy coupling portion 310 and a controller portion 320. The energy coupling portion 310 includes a supply portion 312 and a controllable load impedance portion 314. The controller portion 320 includes a processing and control portion 322 and a memory 324. The IMC is connected to a scale loop 204, and in some embodiments it may be desirably coupled between connecting conductors 210 outside of the loop portions 206 and 208.

As described in more detail below, in operation the energy coupling portion 310 may receive energy from a current (e.g., AC current) induced in the connected scale loop 204, and provide an operating voltage level. The controller portion 320 is powered by the energy coupling portion 310, and controls operations during a position dependent signal generating state and a code signal generating state. During the position dependent signal generating state, the controller portion 320 causes the IMC to implement a mode where low impedance is provided within the scale loop 204 at the excitation frequency, and to not modulate the scale loop impedance. Thus, signal coupling of a connected scale loop 204 during the position dependent signal generating state is substantially the same as for scale loops 204 not connected to IMCs.

During the code signal generating state, the controller portion 320 causes the IMC to modulate the scale loop impedance using a unique coded modulation to couple a unique coded signal into the readhead 140. The unique coded signal is indicative of a coarse resolution absolute position of the scale loop 204 that couples that signal. In various implementations, certain operations that occur during the code signal generating state (e.g., for applying a time-varying drive signal at an excitation frequency) may be similar to operations that occur during the position dependent signal generating state. For example, with respect to the components illustrated in FIG. 1, during the code signal generating state the transmitter drive signal generator 220 may be connected to output an excitation frequency to the excitation winding 218. With respect to FIG. 2, this operation induces an AC current in the loop portion 208 and loop 204 which correspondingly results in a current to the connected IMC. A supply portion 312 of the energy coupling portion 310 receives energy from the induced current and utilizes the energy to power the processing and control portion 322 and memory 324. For some such applications, a controllable load impedance portion 314 and/or the supply portion 312 may comprise a capacitive impedance for the induced current, and the supply portion 312 may comprise a power rectifier circuit that charges to an operating voltage, as illustrated in U.S. Pat. Nos. 5,606,323 and 7,595,729, which relate to the field of RFID technologies and which are each hereby incorporated by reference in their entireties. Numerous alternatives for certain other components and subcircuits usable in the impedance modulating circuit IMC may also be found in the incorporated references and more generally in the related field of RFID technologies.

Once the processing and control portion 322 and memory 324 receive power from the supply portion 312, various functions may be implemented, as will be described in more detail below with respect to FIG. 3. For example, during the position dependent signal generating state, the IMC may implement a low impedance mode. Then, during a code signal generating state, the memory 324 may be utilized to provide data to the processing and control portion 322 for producing a unique coded modulation. In one embodiment, a memory 324 (which may be indistinguishable from the processing and control portion 322) of each IMC may store or generate data that may be utilized for producing a unique coded modulation that allows a given IMC to be distinguished from other IMCs.

In various implementations, the memory 324 and the corresponding unique coded signal that is produced in the readhead may be provided in various forms. For example, in one implementation a sequence of binary values may be produced to identify the IMC. In another implementation, a signal may be produced at a unique timing within the code signal generating state for uniquely identifying the IMC. In other implementations, other identification techniques or hybrids of such identification techniques may be utilized. Numerous alternatives for identification schemes and related impedance modulating and/or control subcircuits may be found in the incorporated references and more generally in the related field of RFID technologies. However, it should be appreciated that due to the controlled number and layout of devices possible in the present application, known RFID identification schemes may be considerably simplified, allowing shorter identification times and lower power consumption.

In various implementations, the unique coded modulation (as well as the previously described low impedance mode) may be produced using a distinguishable controllable load impedance portion 314 (e.g., which may include switches, capacitors, inductors, transistors and/or other components, etc.) which may be controlled through a signal line or bus SL1 from the processing and control portion 322, as illustrated. However, it will be appreciated that in some alternative implementations, the controllable load impedance portion 314 may be coupled in alternative locations within the IMC and/or may include separate components that are each coupled in alternative locations. In other implementations, a controllable load impedance maybe merged with and/or indistinguishable from the processing and control portion 322.

In the embodiment shown in FIG. 2, during the code signal generating state, the winding 218 is operated for excitation and the winding 216 is connected and operated as a receiver winding. As the impedance of the scale loop 204 is modulated, the induced current and the magnitude of the coupled field in the loop is correspondingly modulated, to produce a code signal from the winding 216. This process may be controlled, and the resulting signals sensed, in combination with other operations in an encoder, as outlined below for example.

Figure 3:
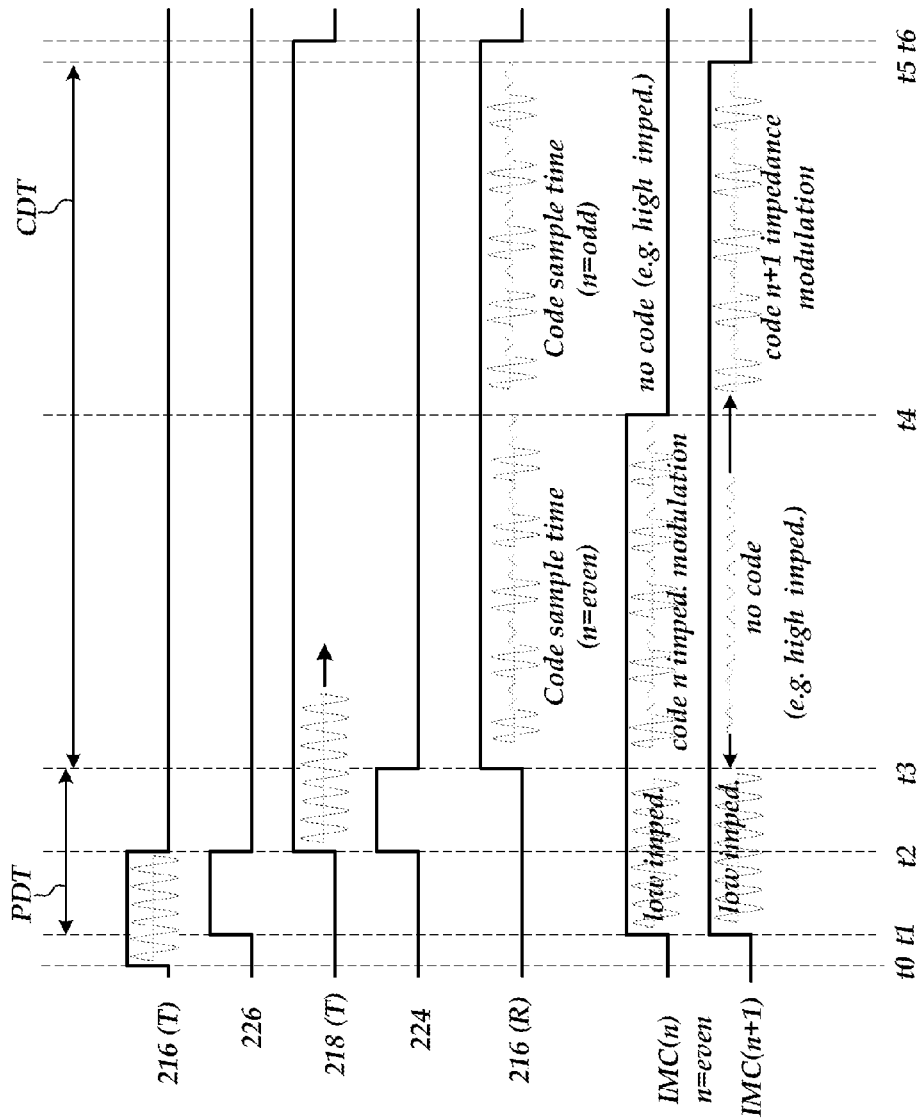
FIG. 3 is a timing diagram illustrating the operation of the position encoder of FIG. 1.

FIG. 3 is a timing diagram illustrating signals corresponding to one embodiment of a system for operating of the position encoder of FIG. 1. As shown in FIG. 3, a period from a time t1 to a time t3 corresponds to a position dependent signal sample time PDT for a corresponding position dependent signal generating state, and a period from a time t3 to a time t5 corresponds to a code dependent signal sampling time CDT for a code signal generating state.

At time t0, the excitation winding 216 (i.e., designated in this instance with a (T) for transmitter) begins transmitting a time-varying drive signal or excitation frequency. This corresponds to the signal coupling loop switches 222 coupling the excitation winding 216 to the transmitter drive signal generator 220. In various implementations, the excitation frequency may be in the megahertz range.

From time t0 to time t1, the time-varying drive signal is coupled to any loops within excitation winding 216, and powers up their corresponding IMCs to an operating voltage level (e.g., the IMCs IMC(n) and IMC(n+1)). More specifically, various components of the supply portion 312 shown in FIG. 2 may require time to accumulate a sufficient charge/voltage to power the IMC controller portion 320. In this regard, the processing and control portion 322 may include voltage threshold circuitry, or the like, that determines when to start a cycle of operations of the controller portion 320.

At time t1, the impedance modulating circuits IMC(n) and IMC(n+1) start a cycle of operations and provide a low impedance state in their loops until time t3 (e.g., as controlled by a clock or counter of the processing and control portion 322). Also at time t1, the second set of spatially modulated receiver windings 226 is connected (e.g., in the receiver signal processor 242) to begin providing position dependent signals corresponding to the wavelength P2, which continues until time t2.

At time t2, the time-varying drive signal is switched from the excitation winding 216 (T) to the excitation winding 218 (T), as controlled by the control unit 244 and the signal coupling loop switches 222. Also, the receiver signal processor 242 disconnects the second set of spatially modulated receiver windings 226 and connects the first set of spatially modulated receiver windings 224 to begin providing position dependent signals corresponding to the wavelength P1, which continues until time t3. During the switching transition that occurs at time t2, the impedance modulating circuits IMC(n) and IMC(n+1) have at least a minimal energy storage capability and remain operational despite the brief excitation signal interruption.

At time t3, the position dependent signal sample time PDT ends and the code dependent signal sampling time CDT begins. During the code dependent signal sampling time CDT (i.e., from time t3 to time t5), the time-varying drive signal continues to be applied to the excitation winding 218, continues to excite proximate loops 204, power the impedance modulating circuits IMC(n) and IMC(n+1), and also to provide a carrier wave that may be modulated and detected according to the unique coded modulations provided by the impedance modulating circuits IMC(n) and IMC(n+1).

Also, at time t3 the receiver signal processor 242 disconnects the first set of spatially modulated receiver windings 224 and connects the winding 216 (i.e., now designated with an "R" as indicating a receiver winding) in cooperation with the signal coupling loop switches 222 to begin providing code dependent signals corresponding to the impedance modulating circuits IMC(n) and IMC(n+1) until the time t5. Using the winding 216 as a receiver winding for the code signals may be advantageous in that it is not spatially modulated, making the code signals independent of the position of an IMC within its area. Also, its length is chosen such that the number of the alternatingly positive and negative scale loop signals coupled within its area is nominally balanced, resulting in a relatively balanced overall signal (e.g., near 0). The unique coded signal modulations provided by the "IMC loops" within its area then stand out against this "nominally zero" background, for indicating the coarse resolution absolute position. However, in various implementations, with appropriate connections and signal processing the receiver windings 224 may also or alternatively be utilized for detecting the unique coded modulations produced by the impedance modulating circuits IMC.

From time t3 to time t5, the impedance modulating circuits IMC(n) and IMC(n+1) are shown as sequentially producing their unique coded modulations. More specifically, from time t3 to time t4, the impedance modulating circuit IMC(n) modulates the impedance of its connected scale loop which produces a unique coded signal on the receiver winding 216, indicating a coarse resolution absolute position corresponding to IMC(n) being located within the receiver winding 216. Also from time t3 to time t4, the impedance modulating circuit IMC(n+1) is shown to switch to a "no code" state, which in various implementations may correspond to a particular static state of the IMC (e.g., a static high impedance, low impedance, mid-level impedance, etc.).

Conversely, from time t4 to time t5, the impedance modulating circuit IMC(n) switches to a no code state, and the impedance modulating circuit IMC(n+1) produces a unique coded signal on the receiver winding 216, indicating a coarse resolution absolute position corresponding to IMC (n+1) being located within the receiver winding 216. From either of the unique coded signals from the impedance modulating circuits IMC(n) or IMC(n+1), the control unit 244 is able to determine the course resolution absolute position of the scale loops 204 of the scale configuration 120 relative to the readhead 140. More specifically, in one implementation the control unit 244 is able to access data which relates each unique code with a particular period of the medium spatial wavelength Pmed along the absolute scale configuration 120. The absolute position within a particular period of one of the wavelengths P1 or P2 may then be determined according to known methods.

At time t5, the impedance modulating circuit IMC(n+1) stops modulating the impedance of the connected scale loop. In various embodiments, the foregoing IMC switching described at the times t3, t4 and t5 may be based on an internal clock or counter in each IMC. In various implementations, this "timing out" by the impedance modulating circuit IMC(n+1) is either detected by the control unit 244, or else separate timing is utilized by the control unit 244 at time t6 for ceasing the receiving of signals from the receiver winding 216(R) and for ceasing the production of the time-varying drive signal on the excitation winding 218. After the excitation signal stops, each of the impedance modulating circuits IMC(n) and IMC(n+1) may dissipate its stored energy and/or "reset" to an inactive state, ready for its next operating cycle. Such a "reset" may be desirable for sufficiently resetting or "re-synchronizing" the internal clocks, counters, or other timing mechanisms of the IMCs with each other and with the control unit 244. In other implementations having other means to maintain sufficient synchronization, continuous power may be provided to the impedance modulating circuits (e.g., through a continuous time-varying drive signal being provided to the excitation winding 216 and/or 218). In the timing diagram of FIG. 3, in various implementations, the timing for each of the transitions from time t1 to time t5 for each of the impedance modulating circuits IMC(n) and IMC(n+1) is controlled by internal clocks, counters (e.g., of cycles of the excitation frequency) or other timing mechanisms. In order to be tolerant of less-than-perfect synchronization of the IMCs with each other and/or with the control unit 244, buffer periods may be added between the switching times for various components. Certain example buffer periods are schematically illustrated in FIG. 3, such as a short buffer before the start of the production of the impedance modulations for each of the impedance modulating circuits (e.g., for a short period immediately after time t3 for the impedance modulating circuit IMC(n) and immediately after time t4 for the impedance modulating circuit IMC(n+1)). Such time buffers help ensure that the full unique coded signal is received in the expected time slot in readhead processor 141, even if an internal timing of an IMC is slightly off. Additional time buffers may be used where needed.

In various implementations, the unique coded signal that is produced by each IMC may be in various forms. For example, a sequence of binary values may be produced that uniquely identifies the impedance modulating circuit. As a specific illustrative example, in an implementation where a medium spatial wavelength Pmed is approximately 40 mm and the overall scale length is approximately 4 m, it may be desirable to include at least a minimum of 100 impedance modulating circuits (i.e., a minimum of at least one in each medium spatial wavelength Pmed so as to allow the absolute location of each medium spatial wavelength Pmed to be resolvable). Disregarding the use of the code start time (e.g., t3 or t4) as a potential aspect of coding, such a configuration may require 7 code bits, which provides 128 unique codes.

In another implementation, a signal or signal transition may be produced at a unique timing within the code signal generating state for uniquely identifying the impedance modulating circuit. In such an implementation, the number of identifiable or resolvable subdivisions of the code dependent signal sampling time would depend on the number of impedance modulating circuits (e.g., at least 100 subdivisions in the above example with at least 100 impedance modulating circuits). In one such implementation, adjacent IMC's may signal or transition at adjacent subdivisions in the sample time, such that their received signals indicate the coarse absolute position with sufficient resolution, either independently or in combination. In various implementations, other types of identification techniques and/or hybrids of such identification techniques may also be utilized.

In the example implementation of FIG. 3, an identification technique is utilized which includes both time slots (i.e., different time slots for n=even and n=odd impedance modulating circuits), and a unique identification that is transmitted during the given time slot. In various implementations, the relative spacing of the IMCs may be configured so that the receiver winding 216 will always cover at least one, and at most two, scale loops with connected impedance modulating circuits, regardless of the absolute scale position. It will be appreciated that the illustrated technique of utilizing the "even" and "odd" time slots addresses the issue of potential conflicts (i.e., "collisions") between the transmissions by adjacent impedance modulating circuits, at positions where two IMC loops are within the receiver winding 216, which simplifies and shortens the processing required for resolving the unique coded signals. Alternatively, a number of techniques developed in the field of RFID technologies may be used for avoiding "code collisions" of this type (e.g., utilizing a "slotted Aloha" system, an "adaptive binary tree" protocol, etc. However, many of these techniques may be more complex and may correspondingly take more time than needed for various configurations such as those disclosed herein, for which the "even" and "odd" time slot technique may be more effective.

It will be appreciated that in various implementations the required length of the code dependent signal sampling time CDT (i.e., from time t3 to time t5) may be determined in part based on the type of unique coded signal utilized and the number of impedance modulating circuits that need to be identified. For example, in the above described implementation where the unique coded signal is represented as a number of bits, the transmission of each bit may take a specified period of time (e.g., if each modulation transition of a scale loop impedance corresponds to one bit, the total time may depend in part on the amount of time required for each modulation transition to be performed). In one specific example implementation, it is estimated that for a system requiring 10 bits, the total code dependent signal sampling time CDT may take on the order of 2 milliseconds to 8 milliseconds. In contrast, the position dependent signal sample time PDT may typically take on the order of less than 1 millisecond (e.g., 0.1 milliseconds). Thus, in various implementations the length of the timing periods illustrated in FIG. 3 may not be to scale.

Due to the longer time typically required for the code dependent signal sampling time CDT, and because the coarse absolute position code changes much less frequently than the finer position dependent signals, in various implementations the absolute position is updated based on the operations of the position dependent signal sample time PDT for a plurality of position cycles, and the operations of the code dependent signal sampling time CDT need be performed only once for each such plurality of position cycles. For example, with respect to FIG. 3, the position dependent signal sample times PDT would thus be repeated multiple times at the beginning of the timing diagram, before the code dependent signal sampling time CDT was performed (e.g., as facilitated by appropriate clock or counter timing within IMC(n) and IMC(N+1) and readhead processor 141. The amount of time allowed between subsequent code dependent signal sampling times CDT may depend in part on the specified maximum speed with which the readhead 140 may be moved relative to the scale configuration 120 (e.g., to ensure that another code dependent signal sampling time CDT would be performed by the time that the readhead may need to resolve a new position corresponding to a new medium spatial wavelength Pmed).

Figure 4:
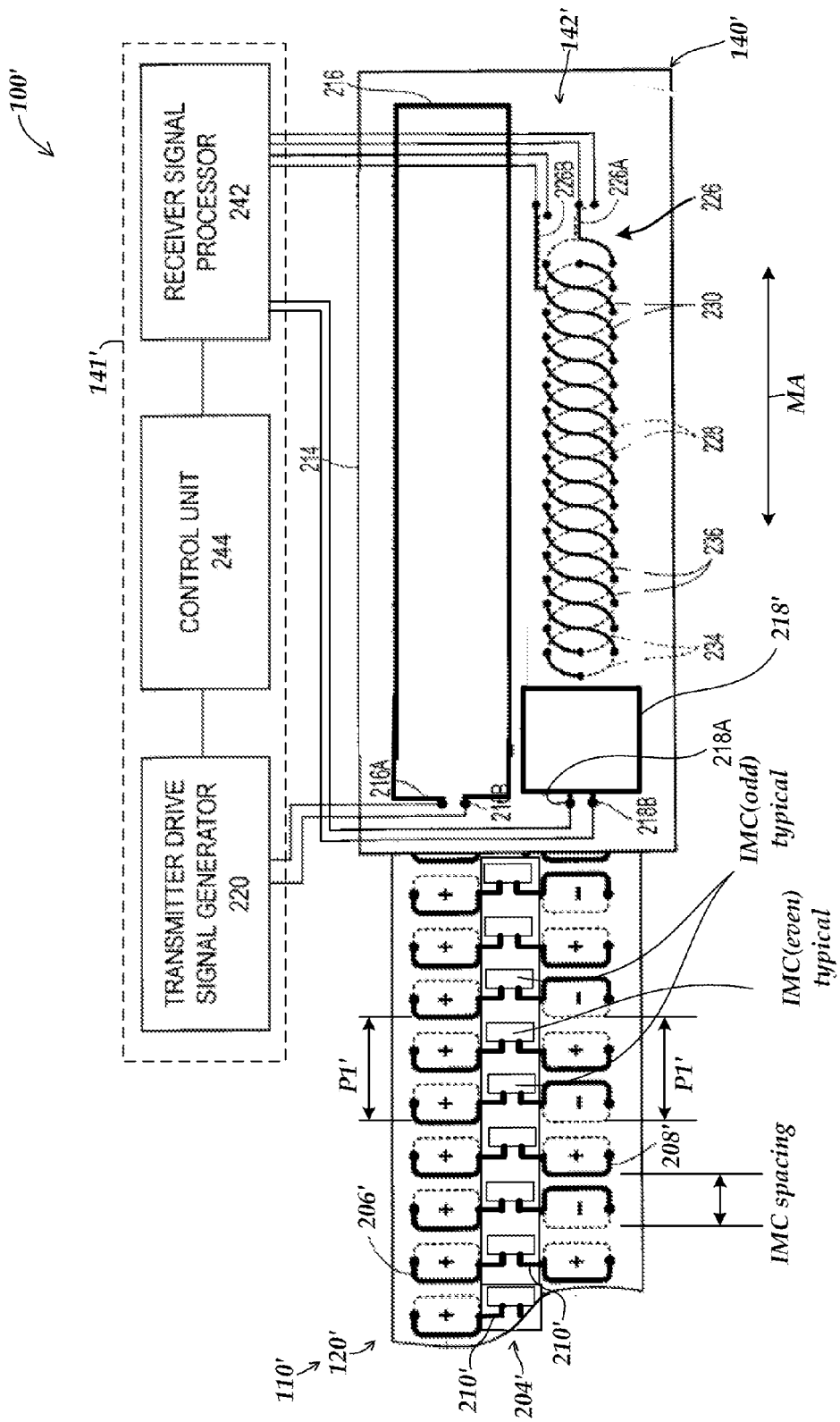
FIG. 4 is a diagram of a position encoder including a second exemplary implementation of an absolute scale configuration with impedance modulating circuits.

FIG. 4 is a diagram of a position encoder 100' including a second exemplary implementation of an absolute scale configuration 120' with impedance modulating circuits IMC. It will be appreciated that certain components of the position encoder 100' and absolute scale configuration 120' may be similar to those of the position encoder 100 and absolute scale configuration 120 of FIG. 1, and similarly numbered elements (e.g., 204 and 204') will be understood to operate similarly, except as otherwise described below. One difference of the position encoder 100' is that a readhead 140' includes only a single set of spatially modulated receiver windings 226 which correspond to a set of signal coupling loop portions 208' that are distributed, similarly to the loop portions 206' and the remainder of each loop 204', based on a single spatial wavelength P1'. Since the loops 204' of the absolute scale configuration 120' of the position encoder 100' include no loop layout variations (e.g., P2 and/or Pmed) which allow one period of the wavelength P1' to be distinguished from another, in the implementation of FIG. 4 an IMC is shown as coupled to every scale loop 204' through its connecting conductors 210', which extend between the first and second signal coupling loop portions 206' and 208', so that each period may be distinguished from others.

The readhead 140' is shown to include a readhead processor 141' and a spatially modulated signal coupling configuration 142' which includes an excitation winding 216 and the set of spatially modulated receiver windings 226. The excitation winding 216 is excited by the readhead processor 141' with a time-varying drive signal (e.g., at an excitation frequency) during both a position dependent signal generating state and a code signal generating state; thus the signal coupling loop switches shown in FIG. 1 are not required in this embodiment.

An absolute scale 110' includes the absolute scale configuration 120' which includes a plurality of scale loops 204' and a plurality of impedance modulating circuits IMC. The scale loops 204' each include a signal coupling loop portion 208' and an excitation coupling portion 206'. The excitation winding 216 is aligned with and inductively couples to the excitation coupling portions 206'. The set of spatially modulated receiver windings 226 is aligned with and inductively couples to the signal coupling loop portions 208'. The set of spatially modulated receiver windings 226 is also connected to the receiver signal processor 242 of the readhead processor 141' to produce at least one position-dependent signal in the readhead 140', at least during the position dependent signal generating state, similar to the operations described above with respect to FIG. 1.

Each of the scale loops 204 is shown to have a connected IMC. As described above with respect to FIGS. 1-3, the respective IMCs are configured to provide relatively low scale loop impedance at the excitation frequency during a position dependent signal generating state. In various implementations, the excitation frequency during the position dependent signal generating state may be relatively high (e.g., at least 1 MHz in one implementation). For operation during a code signal generating state, the readhead 140' is shown to further include a code signal receiving winding 218' that is not spatially modulated. The code signal receiving winding 218' is aligned with and inductively couples to the signal coupling loop portions 208' and is connected to the receiver signal processor 242 of the readhead processor 141' to produce the unique coded signal in the readhead, at least during the code signal generating state. As will be described in more detail below with respect to FIG. 5, the code signal receiving winding 218' is sized so as to cover approximately two signal coupling loop portions 208' with respective attached impedance modulating circuits IMC. In this configuration, designations are alternatingly provided for impedance modulating circuits IMC(even) and IMC(odd), similar to the IMC(n) and IMC(n+1) designations indicated above with respect to FIG. 1.

In various implementations, the same excitation frequency for the time-varying drive signal as applied to the excitation winding 216 may be used during the position dependent signal generating state and the code signal generating state. Similar to the operations for the impedance modulating circuits IMC described above with respect to FIGS. 1-3, during the code signal generating state, a respective IMC is configured to provide a unique coded modulation of the impedance of a connected scale loop 204'. In various implementations, the unique coded modulation includes at least one transition between a first scale loop impedance and a second scale loop impedance, wherein each at least one transition causes a corresponding change in a characteristic of a signal at the excitation frequency that the code signal receiving winding 218' is coupled to receive during the code signal generating state. Further aspects of IMC operation are outlined below with reference to FIG. 5.

Figure 5:
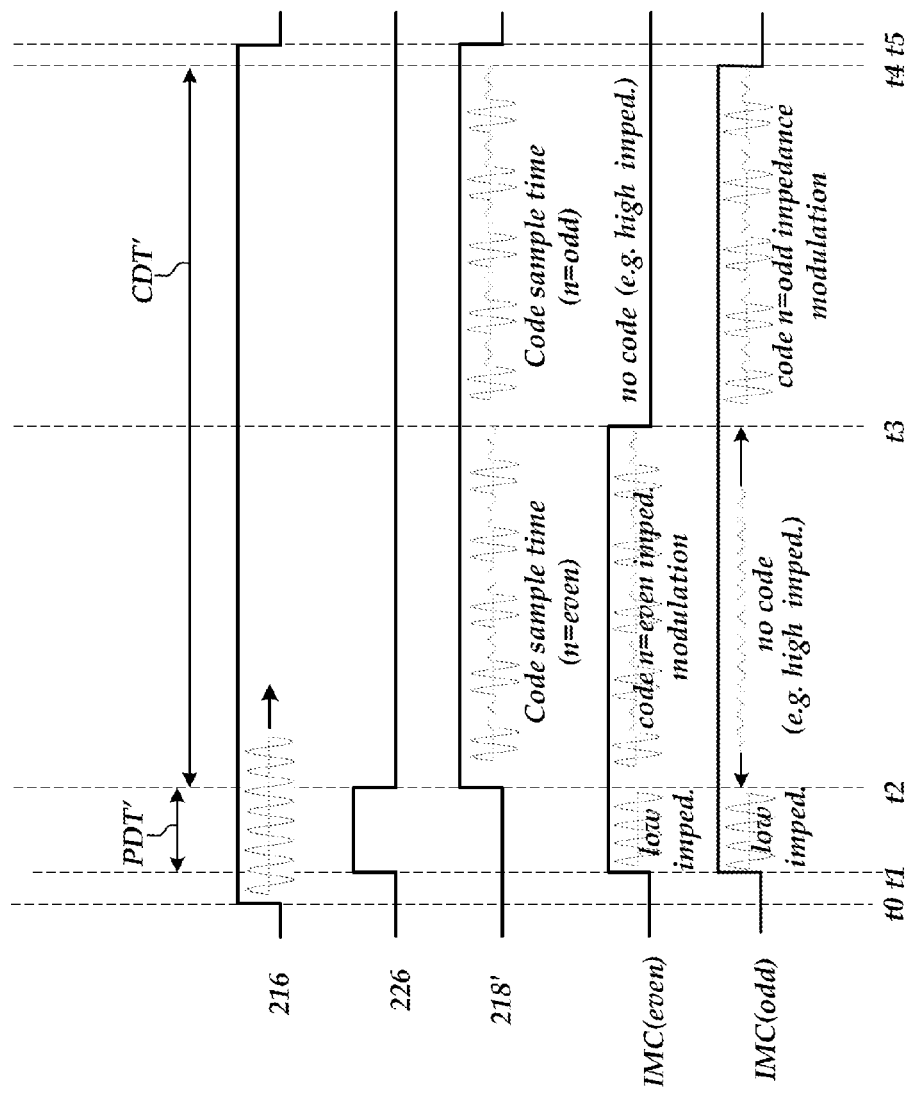
FIG. 5 is a timing diagram illustrating the operation of the position encoder of FIG. 4.

FIG. 5 is a timing diagram corresponding to one embodiment of a system for operating the position encoder of FIG. 4. It will be appreciated that certain aspects of the timing signals of FIG. 5 may be similar to the timing signals of FIG. 3, and will be understood to operate similarly, except as otherwise described below.

At time t0, the excitation winding 216 transmits a time-varying drive signal at an excitation frequency as received from the transmitter drive signal generator 220. From time t0 to time t1, the time-varying drive signal is coupled to any loops within excitation winding 216, and powers up their corresponding IMCs, IMC(even) and IMC(odd), to an operating voltage level. At time t1, the impedance modulating circuits start a cycle of operations and provide a low impedance state in their loops until time t2 (e.g., as controlled by a clock or counter of the processing and control portion 322). Also at time t1, the set of spatially modulated receiver windings 226 is connected (e.g., in the receiver signal processor 242) to begin providing position dependent signals corresponding to the wavelength P1', which continues until time t2. The receiver signal processor 242 of the readhead processor 141' inputs and samples the output signals from the set of spatially modulated receiver windings 226, converts these signals to digital values and outputs them to control unit 244. The control unit 244 processes these digitized output signals to determine the relative position x between the readhead 140' and the absolute scale configuration 120' within a spatial wavelength P1'. At time t2, the position dependent signal sample time PDT' ends, and the code dependent signal sample time CDT' begins. During the code dependent signal sample time CDT' (from time t2 to time t4), the time-varying drive signal continues to be applied to the excitation winding 218, continues to excite proximate loops 204', power the impedance modulating circuits IMC(even) and IMC(odd), and also to provide a carrier wave that may be modulated and detected according to the unique coded modulations provided by the IMCs.

Also, at time t2 the receiver signal processor 242 disconnects the set of spatially modulated receiver windings 226 and connects the winding 218' to provide code dependent signals corresponding to the impedance modulating circuits IMC(even) and IMC(odd) until the time t4. More specifically, by analogy with operations previously outlined with reference to FIG. 3, from time t2 to time t3, the impedance modulating circuits IMC(odd) are in a no code state (e.g., corresponding to a static impedance), while the impedance modulating circuits IMC(even) modulate the impedance of their corresponding connected scale loops 204' using a unique coded modulation which results in a unique coded signal on the receiver winding 218'. From time t3 to time t4, the impedance modulating circuits IMC(even) enter a no code state (e.g., corresponding to a high impedance), and the impedance modulating circuits IMC(odd) modulate the impedance of their respective connected scale loops 204' using a unique coded modulation which results in a unique coded signal on the receiver winding 218'. The receiver signal processor 242 inputs and samples the output signals from the code signal receiving winding 218', and may convert the signals (e.g., to digital values) which are output to the control unit 244. The control unit 244 processes these output signals to determine the coarse resolution absolute position corresponding to at least one of the impedance modulating circuits IMC, which is combined with the incremental fine wavelength position determined during the position dependent signal generating state to determine an absolute position with a resolution better than the coarse resolution absolute position At time t4, the impedance modulating circuits IMC(odd) time out in accordance with their internal timing mechanisms (e.g., an internal clock) and cease the modulation of the impedance of their respective connected scale loops, for timing and synchronization reasons previously outlined with reference to FIG. 3. In various implementations, this timing out by the impedance modulating circuits IMC(odd) is either detected by the control unit 244, or else separate timing is utilized by the control unit 244 for ceasing at time t5 the production of the time-varying drive signal on the excitation winding 216 and the receiving of signals from the code signal receiving winding 218' by the receiver signal processor 242. In various implementations, a brief delay period is enacted before returning to start another cycle at a time t0, such that each of the impedance modulating circuits IMC (even) and IMC(odd) may dissipate its stored energy and/or "reset" to an inactive state, ready for its next operating cycle. As previously outlined, such a "reset" may be desirable for sufficiently resetting or "re-synchronizing" the internal clocks, counters, or other timing mechanisms of the IMCs with each other and with the control unit 244.

As a related issue, in one specific example implementation the receiver winding 218' may in certain positions be approximately centered over one scale loop with one impedance modulating circuit, and the outer edges of the receiver winding 218' may each be over approximately ½ of two scale loops with different impedance modulating circuits. In such a case, one of the unique coded signals in one of the time slots (e.g., n=even) may be "clean" (i.e., as corresponding to the impedance modulating circuit of the centered scale loop), while the signal produced in the other time slot (e.g., n=odd) may be unrecognizable (e.g., as corresponding to a jumble of partial signals corresponding to each of the ½ covered scale loops of the two impedance modulating circuits at the edges). In such a case, the readhead processor 141 may have capabilities for recognizing the "clean" unique coded signal (e.g., in accordance with evaluations of the transitions in the signal with respect to expected timing, amplitude, number, etc.), and utilizing only the "clean" signal for the determination of the coarse resolution absolute position. At a position where two "clean" signals are received, either or both may be utilized.

Figure 6:
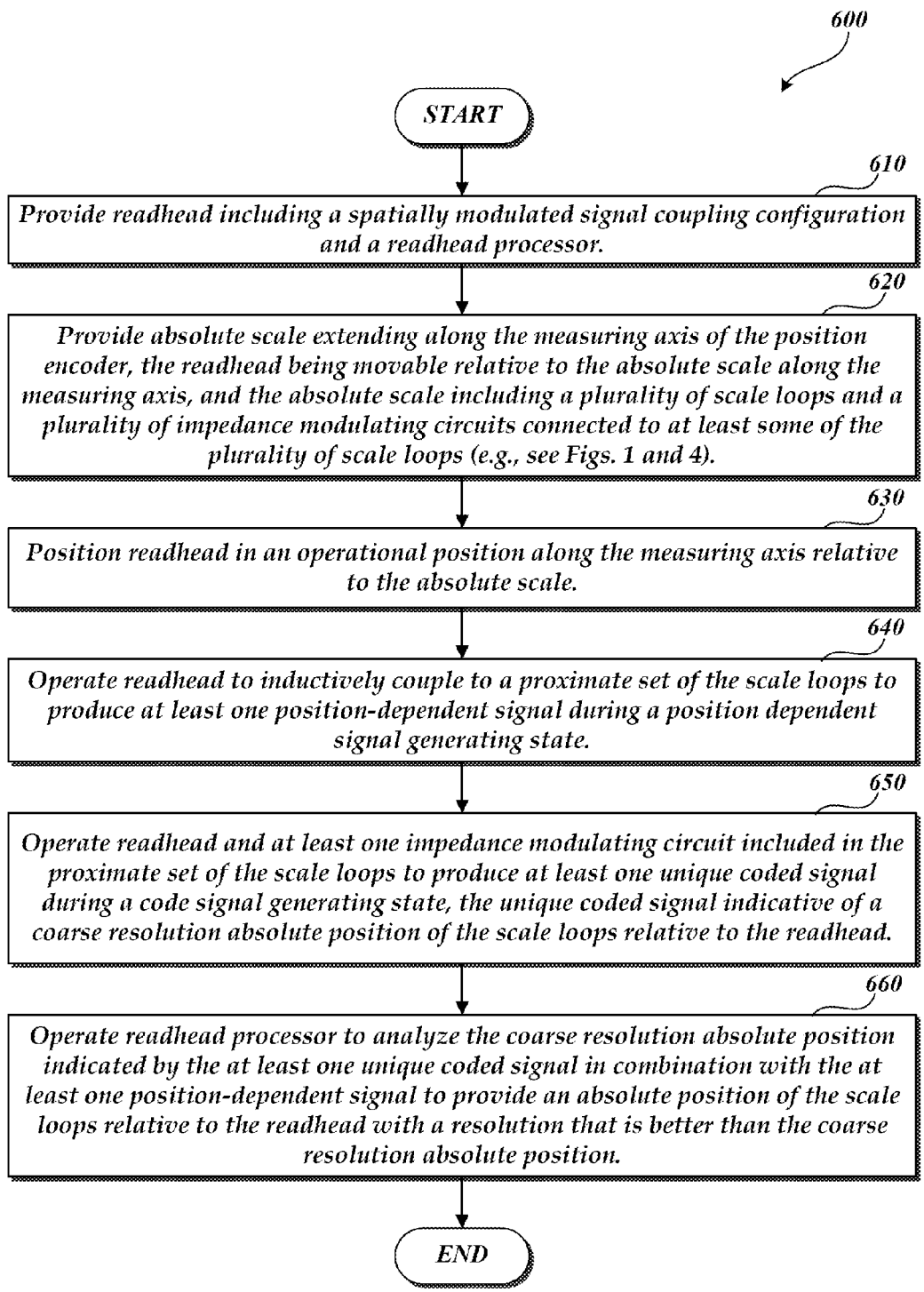
FIG. 6 is a flow diagram illustrating one exemplary implementation of a routine for operating a position encoder including an absolute scale configuration with impedance modulating circuits.

FIG. 6 is a flow diagram illustrating one exemplary implementation of a routine 600 for operating a position encoder including an absolute scale configuration with at least one IMC to provide an absolute position. At a block 610, a readhead is provided including a spatially modulated signal coupling configuration and a readhead processor. At a block 620, an absolute scale is provided extending along the measuring axis of the position encoder (e.g., see FIGS. 1 and 4). The readhead is movable relative to the absolute scale along the measuring axis, and the absolute scale includes a plurality of scale loops and a plurality of impedance modulating circuits connected to at least some of the plurality of scale loops. At a block 630, the readhead is positioned in an operational position along the measuring axis relative to the absolute scale.

At a block 640, the readhead is operated to inductively couple to a proximate set of the scale loops to produce at least one position-dependent signal during a position dependent signal generating state. At a block 650, the readhead and at least one IMC included in the proximate set of the scale loops are operated to produce at least one unique coded signal during a code signal generating state. The unique coded signal is indicative of a coarse resolution absolute position of the scale loops relative to the readhead. At a block 660, the readhead processor is operated to analyze the coarse resolution absolute position indicated by the at least one unique coded signal in combination with the at least one position-dependent signal to provide an absolute position of the scale loops relative to the readhead with a resolution that is better than the coarse resolution absolute position.

While preferred implementations of the present disclosure have been illustrated and described, numerous variations in the illustrated and described arrangements of features and sequences of operations will be apparent to one skilled in the art based on this disclosure. Various alternative forms may be used to implement the principles disclosed herein. In addition, the various implementations described above can be combined to provide further implementations. All of the U.S. patents and U.S. patent applications referred to in this specification are incorporated herein by reference, in their entirety. Aspects of the implementations can be modified, if necessary to employ concepts of the various patents and applications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

The invention claimed is:

1. An absolute scale configuration for use in an absolute position encoder comprising an absolute scale and a readhead that move relative to one another along a measuring axis of the absolute scale, the absolute scale configuration comprising:
a plurality of scale loops which include signal coupling loop portions distributed periodically along the measuring axis and configured to inductively couple to a spatially modulated signal coupling configuration of the readhead to produce at least one position-dependent signal in the readhead that varies spatially periodically depending on a relative position between the scale loops and the readhead during a position dependent signal generating state, wherein:
at least some of the plurality of scale loops are connected to respective impedance modulating circuits, a respective impedance modulating circuit comprising:
an energy coupling portion that receives energy from a current induced in the connected scale loop by the readhead; and
a controller portion which is powered by the energy coupling portion and which does not modulate a scale loop impedance during the position dependent signal generating state and which does modulate the scale loop impedance using a unique coded modulation during a code signal generating state to produce a unique coded signal in the readhead, the unique coded signal indicative of a coarse resolution absolute position of the scale loops relative to the readhead; and
the coarse resolution absolute position is usable in combination with the at least one position-dependent signal to provide an absolute position of the scale loops relative to the readhead with a resolution better than the coarse resolution absolute position.

2. The absolute scale configuration of claim 1, wherein the respective impedance modulating circuit is configured to provide a relatively low scale loop impedance at an excitation frequency provided by the readhead during the position dependent signal generating state.

3. The absolute scale configuration of claim 1, wherein the respective impedance modulating circuit is configured to provide at least one transition between a first scale loop impedance and a second scale loop impedance during the code signal generating state.

4. The absolute scale configuration of claim 1, wherein the respective impedance modulating circuit is configured to provide the unique coded modulation comprising at least one transition between a first scale loop impedance and a second scale loop impedance produced at a unique timing within the code signal generating state, wherein the unique timing defines the unique coded signal that is indicative of the coarse resolution absolute position.

5. The absolute scale configuration of claim 1, wherein the respective impedance modulating circuit is configured to provide the unique coded modulation comprising a plurality of transitions between a first scale loop impedance and a second scale loop impedance during the code signal generating state.

6. The absolute scale configuration of claim 5, wherein the plurality of transitions produce a sequence of binary values that define the unique coded signal that is indicative of the coarse resolution absolute position.

7. The absolute scale configuration of claim 1, wherein:
the spatially modulated signal coupling configuration of the readhead comprises a first spatially modulated signal coupling configuration and a second spatially modulated signal coupling configuration;
the plurality of scale loops include a first set of signal coupling loop portions aligned along the measuring axis direction and distributed periodically along the measuring axis based on a spatial wavelength P1 and configured to inductively couple to the first spatially modulated signal coupling configuration of the readhead to produce at least a first position-dependent signal in the readhead that varies spatially periodically at the spatial wavelength P1 depending on a relative position between the scale loops and the readhead during the position dependent signal generating state;
the plurality of scale loops include a second set of signal coupling loop portions aligned along the measuring axis direction and distributed periodically along the measuring axis based on a spatial wavelength P2 and configured to inductively couple to the second spatially modulated signal coupling configuration of the readhead to produce at least a second position-dependent signal in the readhead that varies spatially periodically at the spatial wavelength P2 depending on a relative position between the scale loops and the readhead during the position dependent signal generating state;
the spatial wavelengths P1 and P2 have a unique phase relationship along the measuring axis direction over a range defining a medium spatial wavelength Pmed; and
respective impedance modulating circuits are connected to scale loops that are located along the measuring axis at a spacing that is at least 0.25*Pmed, and at most Pmed.

8. The absolute scale configuration of claim 7, wherein the respective impedance modulating circuits are connected to scale loops that are located along the measuring axis at a spacing that is at least 0.5*Pmed and less than at least one of (Pmed-P1) or (Pmed-P2).

9. An absolute position encoder, comprising:
a readhead, comprising:
a spatially modulated signal coupling configuration; and
a readhead processor; and
an absolute scale extending along a measuring axis of the position encoder, the readhead being movable relative to the absolute scale along the measuring axis, the absolute scale comprising:
a plurality of scale loops which include signal coupling loop portions distributed periodically along the measuring axis and configured to inductively couple to the spatially modulated signal coupling configuration of the readhead to produce at least one position-dependent signal in the readhead that varies periodically spatially depending on a relative position between the scale loops and the readhead during a position dependent signal generating state; and
a plurality of impedance modulating circuits connected to at least some of the plurality of scale loops, each respective impedance modulating circuit comprising:
an energy coupling portion that receives energy from a current induced in the connected scale loop by the readhead; and
a controller portion which is powered by the energy coupling portion and which does not modulate a scale loop impedance during the position dependent signal generating state and which does modulate the scale loop impedance using a unique coded modulation during a code signal generating state to produce a unique coded signal in the readhead, the unique coded signal indicative of a coarse resolution absolute position of the scale loops relative to the readhead; and
wherein the readhead processor analyzes the coarse resolution absolute position in combination with the at least one position-dependent signal to provide an absolute position of the scale loops relative to the readhead with a resolution that is better than the coarse resolution absolute position.

10. The absolute position encoder of claim 9, wherein:
the spatially modulated signal coupling configuration comprises an excitation winding which is excited by the readhead processor at an excitation frequency during the position dependent signal generating state, and a first set of spatially modulated receiver windings;
scale loops in the plurality of scale loops comprise the signal coupling loop portion and an excitation coupling portion, separated along a direction transverse to the measuring axis;
the signal coupling loop portions are aligned along the measuring axis direction;
the excitation coupling portions are aligned along the measuring axis direction;
the excitation winding is aligned with and inductively couples to the excitation coupling portions;
the first set of spatially modulated receiver windings is aligned with and inductively couples to the signal coupling loop portions and is connected to the readhead processor to produce the at least one position-dependent signal in the readhead, at least during the position dependent signal generating state; and
the respective impedance modulating circuit is configured to provide a relatively low scale loop impedance at the excitation frequency during the position dependent signal generating state.

11. The absolute position encoder of claim 10, wherein the excitation frequency during the position dependent signal generating state is at least 1 MHz.

12. The absolute position encoder of claim 10, wherein:
the readhead further comprises a code signal receiving winding that is not spatially modulated;
the code signal receiving winding is aligned with and inductively couples to the signal coupling loop portions and is connected to the readhead processor to produce the unique coded signal in the readhead, at least during the code signal generating state.

13. The absolute position encoder of claim 12, wherein:
the same excitation frequency is used during the position dependent signal generating state and the code signal generating state;

during the code signal generating state, the respective impedance modulating circuit is configured to provide the unique coded modulation comprising at least one transition between a first scale loop impedance and a second scale loop impedance; and each at least one transition between the first scale loop impedance and the second scale loop impedance causes a corresponding change in a characteristic of a signal at the excitation frequency that the code signal receiving winding is coupled to receive during the code signal generating state.

14. The absolute position encoder of claim 9, wherein the respective impedance modulating circuit is configured to provide at least one transition between a first scale loop impedance and a second scale loop impedance during the code signal generating state.

15. The absolute position encoder of claim 9, wherein the respective impedance modulating circuit is configured to provide the unique coded modulation comprising at least one transition between a first scale loop impedance and a second scale loop impedance produced at a unique timing within the code signal generating state, wherein the unique timing defines the unique coded signal that is indicative of the coarse resolution absolute position.

16. The absolute position encoder of claim 9, wherein the respective impedance modulating circuit is configured to provide the unique coded modulation comprising a plurality of transitions between a first scale loop impedance and a second scale loop impedance during the code signal generating state.

17. The absolute position encoder of claim 16, wherein the plurality of transitions produce a sequence of binary values that define the unique coded signal that is indicative of the coarse resolution absolute position.

18. The absolute position encoder of claim 9, wherein:
the spatially modulated signal coupling configuration of the readhead comprises a first spatially modulated signal coupling configuration and a second spatially modulated signal coupling configuration;
the plurality of scale loops include a first set of signal coupling loop portions aligned along the measuring axis direction and distributed periodically along the measuring axis based on a spatial wavelength P1 and configured to inductively couple to the first spatially modulated signal coupling configuration of the readhead to produce at least a first position-dependent signal in the readhead that varies spatially periodically at the spatial wavelength P1 depending on a relative position between the scale loops and the readhead during the position dependent signal generating state;
the plurality of scale loops include a second set of signal coupling loop portions aligned along the measuring axis direction and distributed periodically along the measuring axis based on a spatial wavelength P2 and configured to inductively couple to the second spatially modulated signal coupling configuration of the readhead to produce at least a second position-dependent signal in the readhead that varies spatially periodically at the spatial wavelength P2 depending on a relative position between the scale loops and the readhead during the position dependent signal generating state;
the spatial wavelengths P1 and P2 have a unique phase relationship along the measuring axis direction over a range defining a medium spatial wavelength Pmed; and respective impedance modulating circuits are connected to scale loops that are located along the measuring axis at a spacing that is at least 0.25*Pmed, and at most Pmed.

19. The absolute position encoder of claim 18, wherein the respective impedance modulating circuits are connected to scale loops that are located along the measuring axis at a spacing that is at least 0.5*Pmed and less than at least one of (Pmed-P1) or (Pmed-P2).

20. A method for determining an absolute position utilizing an absolute scale configuration in an absolute position encoder comprising an absolute scale and a readhead that move relative to one another along a measuring axis of the absolute scale, the method comprising:
providing a readhead, comprising:
  a spatially modulated signal coupling configuration; and
  a readhead processor;
providing an absolute scale extending along the measuring axis of the position encoder, the readhead being movable relative to the absolute scale along the measuring axis, and the absolute scale comprising:
  a plurality of scale loops which include signal coupling loop portions distributed periodically along the measuring axis and configured to inductively couple to the spatially modulated signal coupling configuration of the readhead to produce at least one position-dependent signal in the readhead that varies periodically spatially depending on a relative position between the scale loops and the readhead during a position dependent signal generating state; and
  a plurality of impedance modulating circuits connected to at least some of the plurality of scale loops, each respective impedance modulating circuit comprising:
    an energy coupling portion that receives energy from a current induced in the connected scale loop by the readhead; and
    a controller portion which is powered by the energy coupling portion and which does not modulate the scale loop impedance during the position dependent signal generating state and which does modulate the scale loop impedance using a unique coded modulation during a code signal generating state to produce a unique coded signal in the readhead, the unique coded signal indicative of a coarse resolution absolute position of the scale loops relative to the readhead; and
positioning the readhead in an operational position along the measuring axis relative to the absolute scale;
operating the readhead to inductively couple to a proximate set of the scale loops, to produce the at least one position-dependent signal during the position dependent signal generating state,
operating the readhead and at least one impedance modulating circuit included in the proximate set of the scale loops, to produce at least one unique coded signal during the code signal generating state; and
operating the readhead processor to analyze the coarse resolution absolute position indicated by the at least one unique coded signal in combination with the at least one position-dependent signal to provide an absolute position of the scale loops relative to the readhead with a resolution that is better than the coarse resolution absolute position.

* * * * *